(12) United States Patent
Venkatesan et al.

(10) Patent No.: US 11,093,519 B2
(45) Date of Patent: Aug. 17, 2021

(54) ARTIFICIAL INTELLIGENCE (AI) BASED AUTOMATIC DATA REMEDIATION

(71) Applicant: ACCENTURE GLOBAL SOLUTIONS LIMITED, Dublin (IE)

(72) Inventors: Mahesh Venkatesan, Bangalore (IN);
Akshay Bhaiya, Bangalore (IN);
Mrinal Shankar, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 208 days.

(21) Appl. No.: 16/403,153

(22) Filed: May 3, 2019

(65) Prior Publication Data

US 2020/0349169 A1 Nov. 5, 2020

(51) Int. Cl.
*G06F 7/00* (2006.01)
*G06F 16/25* (2019.01)
*G06N 20/00* (2019.01)
*G06F 16/215* (2019.01)
*G06K 9/62* (2006.01)

(52) U.S. Cl.
CPC ......... *G06F 16/254* (2019.01); *G06F 16/215* (2019.01); *G06K 9/6221* (2013.01); *G06N 20/00* (2019.01)

(58) Field of Classification Search
CPC ..... G06F 16/254; G06F 16/215; G06N 20/00; G06K 9/6221
USPC .................................. 707/600–899
See application file for complete search history.

(56) References Cited

U.S. PATENT DOCUMENTS

2018/0357595 A1\* 12/2018 Rai ........................ G06N 20/00

\* cited by examiner

*Primary Examiner* — Isaac M Woo
(74) *Attorney, Agent, or Firm* — Mannava & King, P.C.

(57) ABSTRACT

An Artificial Intelligence (AI)-based data remediation system accesses analyzes a dataset for identification and remediation of anomalies including missing values and outliers. Based on the attributes associated with the anomalies, the dataset is initially processed via statistical checks for identifying if the dataset includes one of point anomalies, contextual anomalies and time trend anomalies. Based on the type of anomalies various machine learning (ML) based techniques can be employed for identification of the anomalous data points. Expected values are generated. The anomalous data points are replaced with the expected values for the generation of a transformed dataset.

20 Claims, 12 Drawing Sheets

ARTIFICIAL INTELLIGENCE (AI) BASED AUTOMATIC DATA REMEDIATION

BACKGROUND

The rapid improvement in electronics and the advent of networks including the internet, local area networks (LANs), etc., led to the development of many devices emitting data and exchanging data over these networks. As a result, datasets have grown rapidly as many information-gathering devices are now connected and able to emit or exchange data. Big data is a field to extract, analyze and use such large datasets which cannot be handled by traditional data-processing methodologies such as relational database management techniques. Currently large datasets are mined for analytics to determine trends and project future predictions. While data with many values offers greater opportunities for data mining and analytics, increase in the complexity of data with many attributes presents many challenges. The challenges not only involve collection and storage of the data but also include maintaining data quality since the predictions obtained from a volume of data are only as good as the data itself.

BRIEF DESCRIPTION OF DRAWINGS

Features of the present disclosure are illustrated by way of examples shown in the following figures. In the following figures, like numerals indicate like elements, in which:

FIG. 9 shows a dataset with point anomalies identified in accordance with the examples disclosed herein.

DETAILED DESCRIPTION

Figure 1:
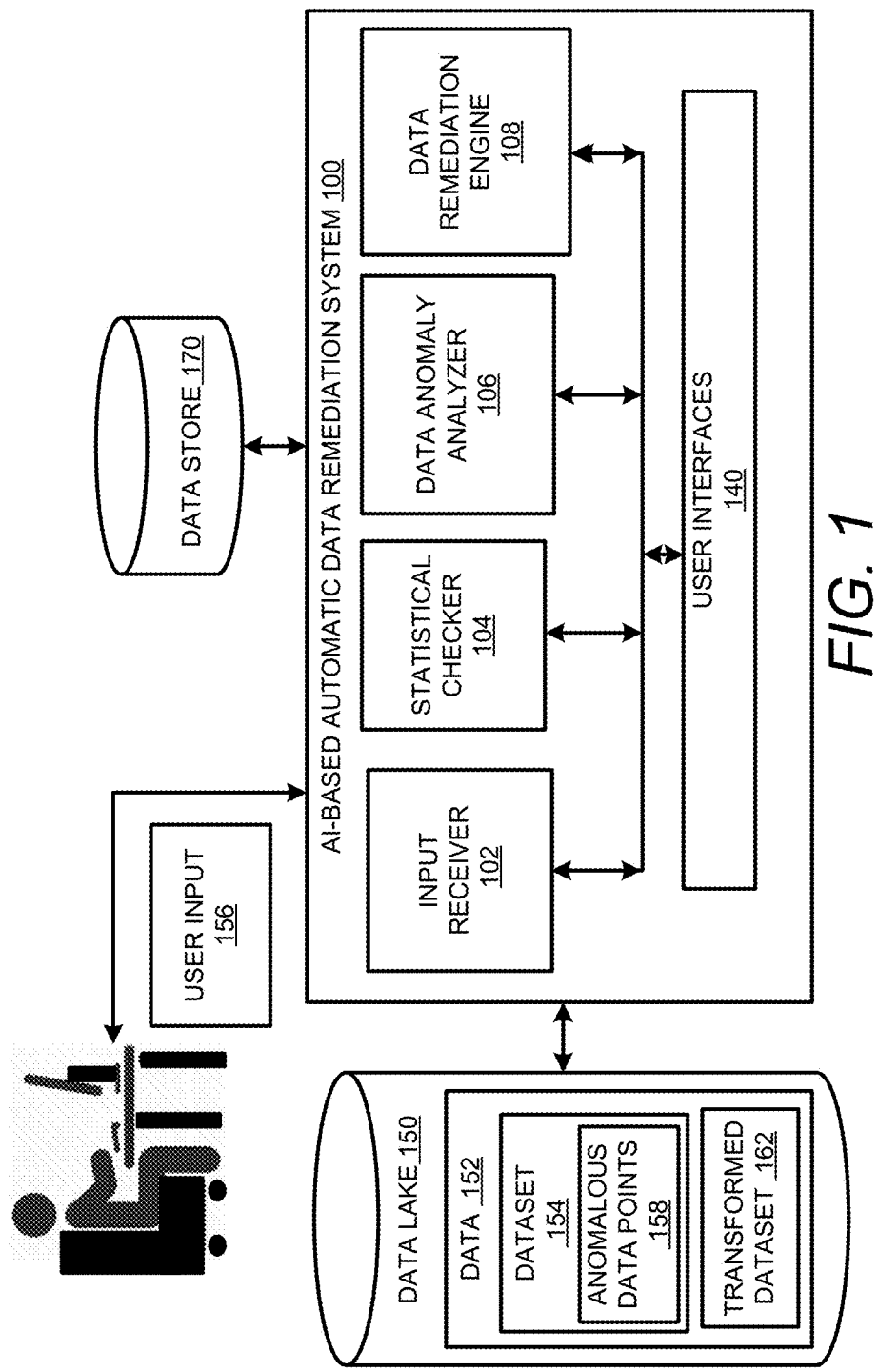
FIG. 1 is a block diagram that shows an AI-based automatic data remediation system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An Artificial Intelligence (AI)-based data remediation system is disclosed herein. The data remediation system analyzes datasets, identifies anomalies in the datasets and provides remediation for the datasets by automatically replacing the anomalous data points with expected values generated from historical data. The anomalies identified and remedied by the data remediation system can include one or more of missing values and anomalies. The data remediation system includes various user interfaces for receiving user input and providing output from different stages of the data remediation processes for user review and validation. The data remediation system can be coupled to a data lake which receives and stores large volumes of data generated by particular systems such as computer systems associated with one or more organizations, etc. In an example, the data remediation system can be associated with the data lake so that the data in the data lake is processed periodically even as it is collected at the data lake.

The data remediation system initially accesses a portion of the data, e.g., a dataset for analysis and processing of anomalies based on a user input providing the access to the dataset. The user input can additionally indicate the nature of the dataset attributes i.e., whether the dataset has a single attribute, multiple attributes or a single attribute tracked over a time period. The user input conveying the nature of the dataset attributes is used later in the process for accurately identifying the anomalies. Initially, statistical checks can be executed on the dataset for identifying portions of the dataset with the anomalies. More particularly, the attributes are analyzed in the context of historical data wherein a data distribution of the dataset is compared to a standard distribution. If the value of a particular attribute includes missing values above a predetermined threshold, or includes more than a threshold number of outliers, e.g., 95, 99 or 99.5 percentile values, then the attribute or portion of the data is selected for further analysis via a rule-based processing. The threshold for the rule can be determined based on a benchmark or a distribution of a benchmark data which has been standardized and validated. As mentioned above, further processing of the dataset depends on the user input indicative of the dataset attribute. If the dataset has a single attribute or only one attribute, then the dataset may be processed for point anomalies. If the dataset has multiple attributes, then the dataset can be processed for contextual anomalies. If the dataset tracks a single attribute over a time period, then the dataset can be processed for time trend anomalies.

Subsequent to the statistical checks, further analysis of the dataset for point anomalies includes validating each data point in the dataset based on the benchmark distribution. Thus, the particular data points with missing values or outliers are isolated for value imputation.

The dataset having multiple attributes is processed for contextual anomalies via tree-based AI techniques which can capture multiple inconsistent data and outliers. In an example, the dataset upon completing the statistical checks and identified as a candidate for remediation is further processed via isolation forest methodology. The isolation forest algorithm can be trained on historical data pertaining to the domain and organization associated with the dataset for determining a decision boundary. The value of each data point in the dataset can be compared to the decision boundary and if the value of the data point exceeds the decision bound, it is designated as an anomalous data point. The anomalous data points are further processed by autoencoders for value imputation.

Deep learning techniques which can capture changes in a data point over a time period are used to process the dataset for time trend anomalies. In an example, the data points in the dataset can be initially clustered using deep learning techniques such as self-organized maps. A self-organized map is a type of artificial neural network (ANN) that is trained using unsupervised learning to produce a representation of the input dataset in low dimensions, e.g., two dimensions. In an example, the self-organized maps can be trained to cluster the data points of the dataset using training data for a domain pertaining to the dataset. The self-organized map technique can be employed to produce data representations that cluster the data points within the datasets of a benchmark dataset from a previous time period and the dataset currently being analyzed for anomalies. The clusters can be compared or the position of each of the data points within the clusters of the benchmark data and the dataset. If a data point has changed its position within a cluster or changed a cluster, then it can be designated or identified as an anomalous data point.

Upon isolating the anomalies within the dataset using the above described techniques, the dataset can be further processed using deep learning based autoencoders. The autoencoders are neural networks that implement unsupervised machine learning (ML) techniques for setting target values equal to the input values. Accordingly, when trained autoencoders are used to process the dataset with the anomalous data points identified, the autoencoders produce as output, values expected in place of the anomalous data points. The values thus obtained can be used to replace the anomalous data points for generating a transformed dataset which has been processed so that it does not include data anomalies.

Many computer platforms currently in place manage data quality by using rule-based mechanisms which require human intervention. This can lead to wastage of expensive resources such as data scientists who waste their time fixing data quality issues. Downstream processes, for example, customer service are affected due to inaccurate data which can lead to customer inconvenience and customer attrition. Moreover, regulatory compliance can be affected as erroneous data can result in erroneous and delayed regulatory reporting. Similarly, computer systems with erroneous data hamper the ability to handle risk which can lead to responses to risk being reactive as opposed to being proactive. This is because low quality data with anomalies leads to erroneous analysis which in turn leads to implementing incorrect strategies. Since quality of results produced from a dataset depend on the integrity of the dataset, having high quality data can automatically lead to improved results. These can include accurate projections based on analysis, improved downstream processes or higher regulatory compliance of technological platforms.

The transformation of a dataset as described herein with anomalies remedied therefore affords a technical improvement in the functioning of a computer system. The data remediation system described herein is a self-healing and fully automated system wherein ML-based deep learning and reinforced learning such as isolation forests and self-organized maps are employed. The data remediation system described herein is also proactive and predictive as the ML algorithms employed herein predict issues automatically. The above-mentioned problems with data quality issues are therefore efficiently addressed via automatic data remediation which capitalizes on the improvements in the AI and ML techniques.

Also, the AI-based automatic data remediation system can be used to remediate data for "big data". Big data, for example, represents data characterized by such a high volume, velocity and variety to require specific technology and analytical methods for its transformation into value. Parallel computing tools may be required to execute predictive analytics, user behavior analytics, or certain other advanced data analytics methods that extract value from the data in a timely manner.

FIG. 1 is a block diagram that shows an AI-based automatic data remediation system 100 in accordance with examples disclosed herein. The data remediation system 100 can be communicatively coupled to a data lake 150 which includes data 152 from a plurality of data sources. The data lake 150 can act as a storage repository that holds a vast amount of raw data in its native format until it is needed. Unlike hierarchical data warehouses that store data in files or folders, the data lake 150 uses a flat architecture to store data. Each data element in the data lake 150 can be assigned a unique identifier and tagged with a set of extended metadata tags. Various types of data including unstructured data can thus be stored to the data lake 150. The data lake 150 can include data from sources such as but not limited to mainframes, local data warehouse, relational databases such as Oracle® or even cloud data sources. The data lake 150 may be hosting various applications for data ingestion, data schedulers, models for various tasks, etc. Based on the domain in which the data lake is employed, the data lake 150 may store data 152 pertaining to customer data, product data, automatic entries generated during automated manufacturing procedures, process monitoring procedures, etc. In an example, the data lake 150 may store "big data", which may each include petabytes (1,024 terabytes) or exabytes (1,024 petabytes) of data consisting of billions to trillions of records of millions of people, and provided from different sources, such as the internet, sales, customer contact center, social media, mobile data and so on.

When a need for data arises, the data lake 150 can be queried for relevant data, and that smaller set of data can then be analyzed to help answer the need. The data sources supplying the data 152 to the data lake 150 can be based on the domain in which the data remediation system 100 operates. While certain aspects of the data remediation system 100 may be discussed below in a particular domain for illustration purposes, it can be appreciated that the data remediation system 100 described herein can be used in any domain to analyze the data and remediate the anomalies in the data 152. Upon identifying and remediating the anomalies, a transformed dataset 154 which is more accurate is generated by the data remediation system 100 and uploaded to the data lake 150.

The data remediation system 100 can be coupled to a data store 170 for storing intermediate values which may be generated during the analysis of the dataset 154. The data remediation system 100 includes an input receiver 102, a statistical checker 104, a data anomaly analyzer 106 and a data remediation element 108. Each of the elements of the data remediation system 100 can be connected to one or more of the user interfaces 140 for providing user inputs, accessing data outputs and for data validation purpose at each stage. Accordingly, a dataset 154 from the data 152 can be initially accessed for analysis and remediation purposes by the input receiver 102. The input receiver 102 can be further configured to receive a user input 156, including the number of attributes associated with the dataset 154. The number of attributes of the dataset 154 enables determining the type of anomalies that are to be identified and remediated within the dataset 154. If the user input 156 indicates that the dataset 154 has a single attribute, then the dataset 154 is analyzed for point anomalies. In an example, an attribute can include a particular field of the dataset 154 which is being analyzed for anomalies. If the user input indicates that the dataset 154 has multiple attributes, then the dataset 154 is analyzed for contextual anomalies. If the user input indicates that the dataset 154 tracks an attribute of an entity over a time period, then the dataset 154 can be processed for time trend anomalies.

Prior to the actual processing of the dataset 154 for the various types of anomalies, the dataset 154 is initially analyzed by the statistical checker 104 for detecting the presence of anomalies that are to be remediated. The statistical checker 104 identifies if any anomalies such as missing values and extreme values are included in the dataset 154 via statistical checks which can include comparisons of data distributions as detailed further infra. Furthermore the statistical checker 104 can further determine the portions of the dataset 154 that include the anomalies. In case it is determined by the statistical checker 104 that the dataset 154 carries no anomalies, further processing of the dataset is halted. If however, it is determined by the statistical checker 104 that the dataset 154 includes anomalies that need remediation, the dataset 154 is transmitted to the data anomaly analyzer 106 for further analysis.

The data anomaly analyzer 106 includes mechanisms for handling different types of anomalies. When the user input 156 is indicative of point anomalies, the data anomaly analyzer 106 can execute a comparison of a current distribution of the dataset 154 with a prior distribution obtained in a benchmark period. Value imputation for the anomalies for anomalous data points 158 is thus carried out via comparison of distributions for point anomalies. If the user input 156 is indicative of contextual anomalies, the data anomaly analyzer 106 employs ML-based techniques such as isolation forest or local outlier factor for identifying the anomalous data points which need remediation. Finally, when the user input 156 is indicates that the dataset pertains to tracking an attribute over a time period, advanced ML techniques such as but not limited to deep learning like self-organizing maps are employed for identifying the anomalous data points in the dataset 154 which are to be remediated.

The result of the analysis of the dataset 154 by the data anomaly analyzer 106 are transmitted to the data remediation element 108. The data remediation element 108 can employ deep learning based autoencoders for predicting the expected values 182 of the data points. The expected values 182 thus obtained are used to replace the anomalous data points 158 in the dataset 154 for generating the transformed dataset 162. The transformed dataset 162 is then uploaded to the data lake 150 for access by the downstream processes.

As mentioned above, the results from each of the statistical checker 104, data anomaly analyzer 106 and the data remediation element 108 can be accessed and monitored via the user interfaces 140. Furthermore the user input 156 indicative of the number of attributes of the dataset 154 can also be provided via one an input user interface from the user interfaces 140. The user interfaces 140 can provide the results of the analysis at different steps of the data remediation process via data visualizations. Some of the data visualizations thus generated are shown and described herein.

In an example, the data remediation system 100 can output the anomalies in interactive visualizations via one or more of the user interfaces 140. The identification of anomalies even prior to the data remediation finds applications in various fields. In an example from the finance domain, the dataset can relate to customer balances, and the anomalies can signify data points that warrant fraudulent activity checks. For example, a high value of 'amount spent' attribute or field in credit card balance data as compared to the 'amount spent' by general populace, e.g., mean of the general populace can be isolated as a point anomaly. When analyzed for contextual anomalies wherein multiple attributes are analyzed, a high value of 'amount spent' with zero value for transaction count for the same credit card—another dataset attribute can signify that a contextual anomaly. The same example when analyzed as a time trend anomaly can be isolated as a high value for 'amount spent' at a particular time point as compared to a predetermined preceding time period, e.g., 12 months, 24 months, etc. Similarly, in the manufacturing domain wherein the dataset pertains to data emitted by the machinery involved in manufacturing or processing a product, the anomalies isolated in accordance with the examples disclosed herein can signify system errors which require review/validation from human operators.

Figure 2:
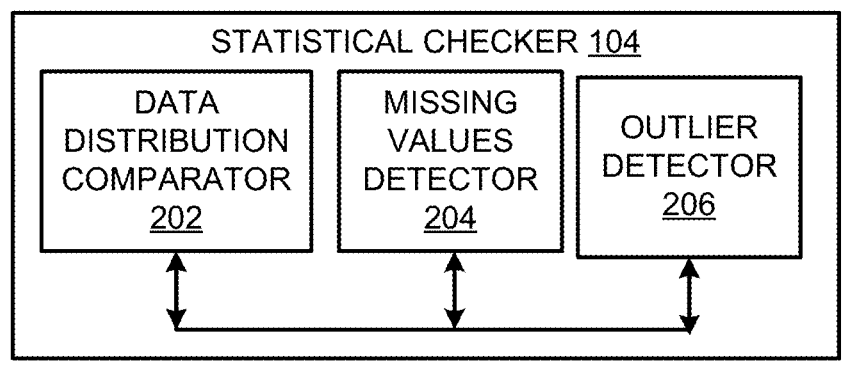
FIG. 2 shows a block diagram of a statistical checker in accordance with the examples disclosed herein.

FIG. 2 shows a block diagram of the statistical checker 104 in accordance with the examples disclosed herein. The statistical checker 104 includes a data distribution comparator 202, a missing values detector 204 and an outlier detector 206. The statistical checker 104 employs statistical techniques to identify anomalies within the dataset 154. The data distribution comparator 202 can initially generate a data distribution of the dataset 154 and compare the data distribution with a historical data distribution of a benchmark period. By way of illustration and not limitation, if the dataset 154 includes financial data of the current period, then any of the preceding time periods can be the benchmark period against with the data distribution of the dataset 154 is compared. The missing values detector 204 can detect the missing data elements from the comparisons obtained from the distribution of the dataset 154 with the historical data distribution. Depending on whether the dataset 154 has one or multiple attributes, the outlier detector 206 compares values of the attribute(s) of the dataset 154 with the value of attribute(s) of a historical data distribution. If the value of the attribute(s) is in one of the higher percentile values as compared to a predetermined threshold, e.g., 95, 99 or 99.5 percentile value, and then the values of the attribute(s) in the dataset 154 can be flagged for further analysis using the ML techniques employed by the data anomaly analyzer 106.

Figure 3:
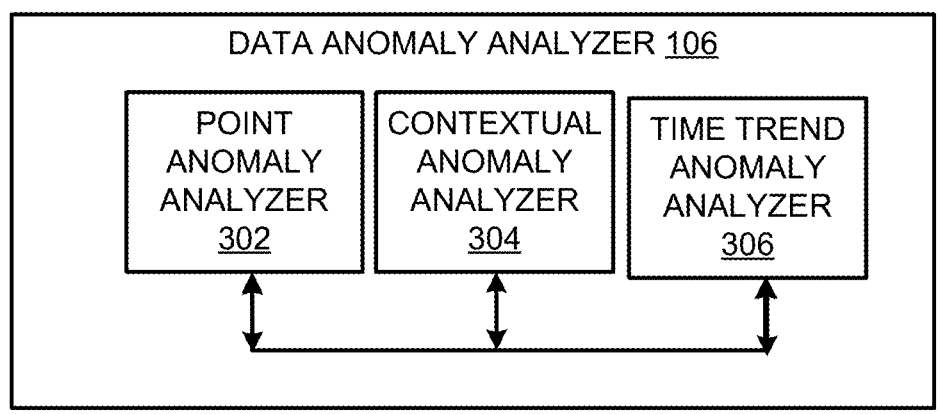
FIG. 3 shows a block diagram of a data anomaly analyzer in accordance with the examples disclosed herein.

FIG. 3 shows the data anomaly analyzer 106 in accordance with the examples disclosed herein. The data anomaly analyzer 106 includes a point anomaly analyzer 302, a contextual anomaly analyzer 304 and a time trend anomaly analyzer 306. When the user's input 156 indicates that the dataset 154 has a single attribute, then the dataset 154 is analyzed by the point anomaly analyzer 302. The point anomaly analyzer 302 can generate a univariate distribution of the dataset to capture percentile distribution volatility and outliers. Accordingly, the point anomaly analyzer 302 captures outliers beyond a threshold and percentile distribution changes. The actions executed by the point anomaly analyzer 302 will be detailed further herein with respect to an example. An output user interface of the user interfaces 140 can generate a visualization that can be set up to flag the point anomalies in the dataset 154.

When the user input 156 indicates that the dataset 154 has multiple attributes, then the contextual anomaly analyzer 304 is used to analyze the dataset 154 to accurately capture inconsistent patterns, identify extreme values and missing values. The contextual anomaly analyzer 304 uses tree-based ML techniques such as isolation forests for analyzing the dataset 154 in isolating the inconsistent patterns and extreme outlier. In an example, the inconsistent patterns and the extreme outliers can be saved to the data store 170.

When the user input 156 indicates that the dataset 154 includes data points that track an attribute over a time period then the dataset 154 is processed by the time trend anomaly analyzer 306. The time trend anomaly analyzer 306 processes the dataset 154 using advanced deep learning techniques such as but not limited to, self-organized maps to identify data points corresponding to the anomalies. In an example, the time trend anomaly analyzer 306 detects cluster changes of data points beyond a threshold as anomalies that are to be remediated.

Figure 4:
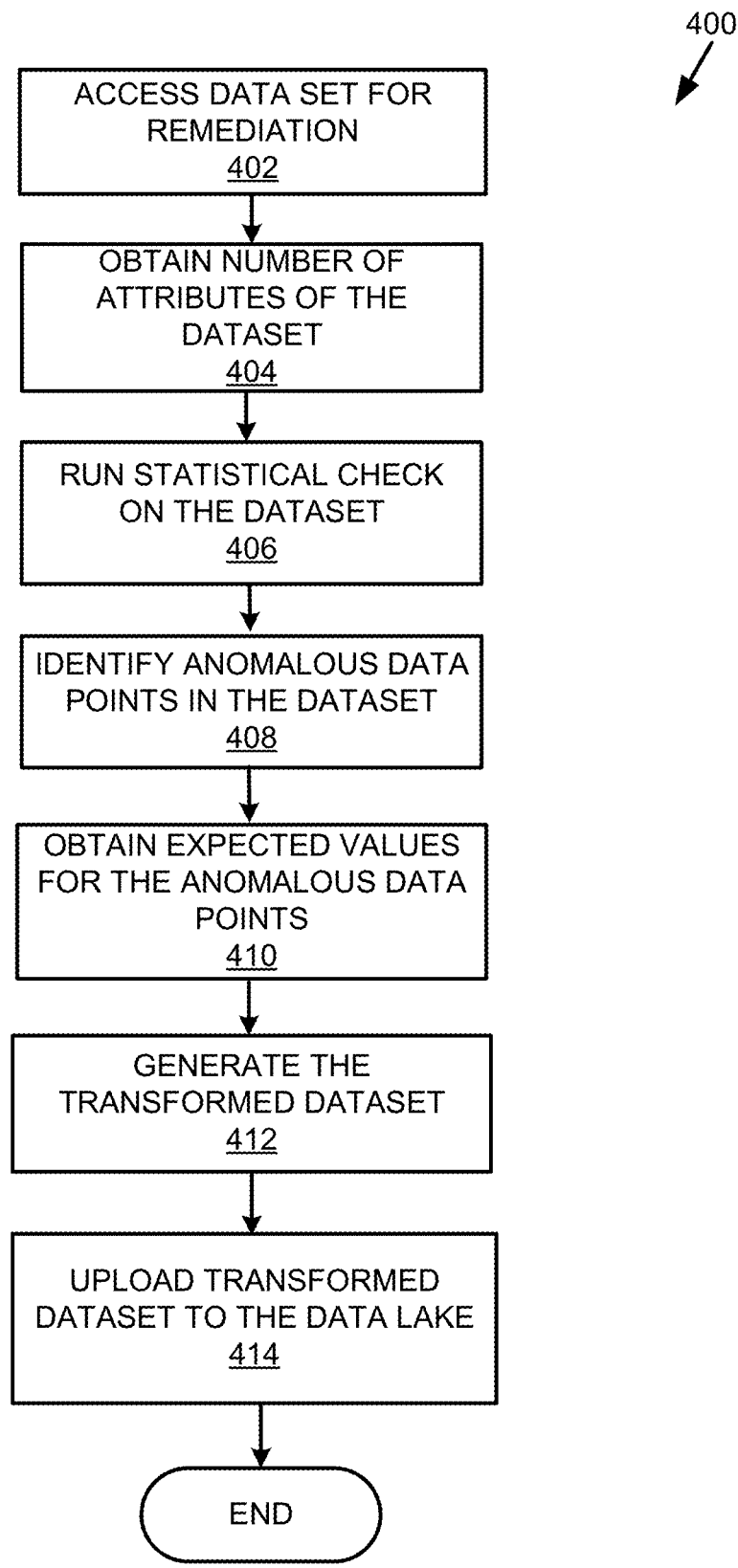
FIG. 4 shows a flowchart that details a method of data remediation in accordance with the examples disclosed herein.

FIG. 4 shows a flowchart 400 that details a method of data remediation in accordance with the examples disclosed herein. The method begins at 402 wherein the dataset 154 for remediation is accessed. In an example, the user input 156 can include the dataset 154 or a link to the dataset 154. The number of attributes of the dataset 154 is also obtained from the user input 156 at 404. At 406, statistical checks are run on the dataset 154 to determine whether the dataset 154 is to be treated for one or more anomalies including missing values and outliers. Furthermore, the portions of the dataset 154 that include anomalies are identified from the statistical checks at 406. Based on the number of attributes provided in the user input, the anomalies in the dataset 154 are classified into one of a plurality of anomaly types—point anomalies, contextual anomalies and time trend anomalies. The anomalous data points 158 are further identified or isolated at 408. The anomaly type as obtained in the user input determines the ML technique that is used to process the dataset 154 at 408 for the identification of the anomalous data points. The data remediation procedures are executed at 410 to obtain expected values for the anomalous data points 158 by employing, for example, deep learning autoencoders. The transformed dataset 162 is generated at 412 by replacing the anomalous data points 158 in the dataset 154 with the expected values. The transformed dataset 162 is uploaded to the data lake 150 at 414 for use by downstream processes.

Figure 5:
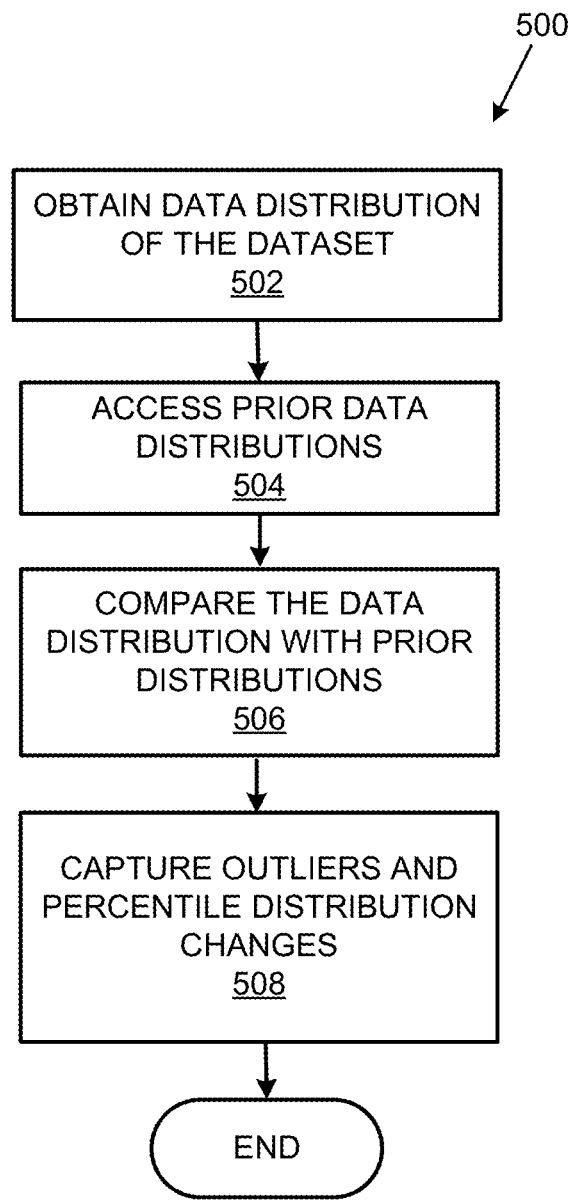
FIG. 5 shows a flowchart that details a method of processing a dataset for point anomalies in accordance with the examples disclosed herein.

FIG. 5 is a flowchart that details a method of processing the dataset 154 for point anomalies in accordance with the examples disclosed herein. The method begins at 502 wherein a data distribution, e.g., a univariate distribution of the attribute can be obtained. The data distribution obtained at 502 can be compared to similar data distributions of prior datasets. Accordingly, the prior dataset distribution is accessed at 504. At 506, the data distribution of the dataset 154 obtained at 502 is compared to the prior data distribution at 504. The outliers beyond a predetermined threshold and percentile distribution changes are captured at 508 based on the comparison of the distributions. In an example, the predetermined threshold for the identification of the outliers can be user-configurable based on the characteristics of the data distributions. By the way of illustration and not limitation, the threshold can be set such that a variation in a data value of more than 30% as compared to the benchmark data or prior distributions can be flagged as an outlier.

Figure 6:
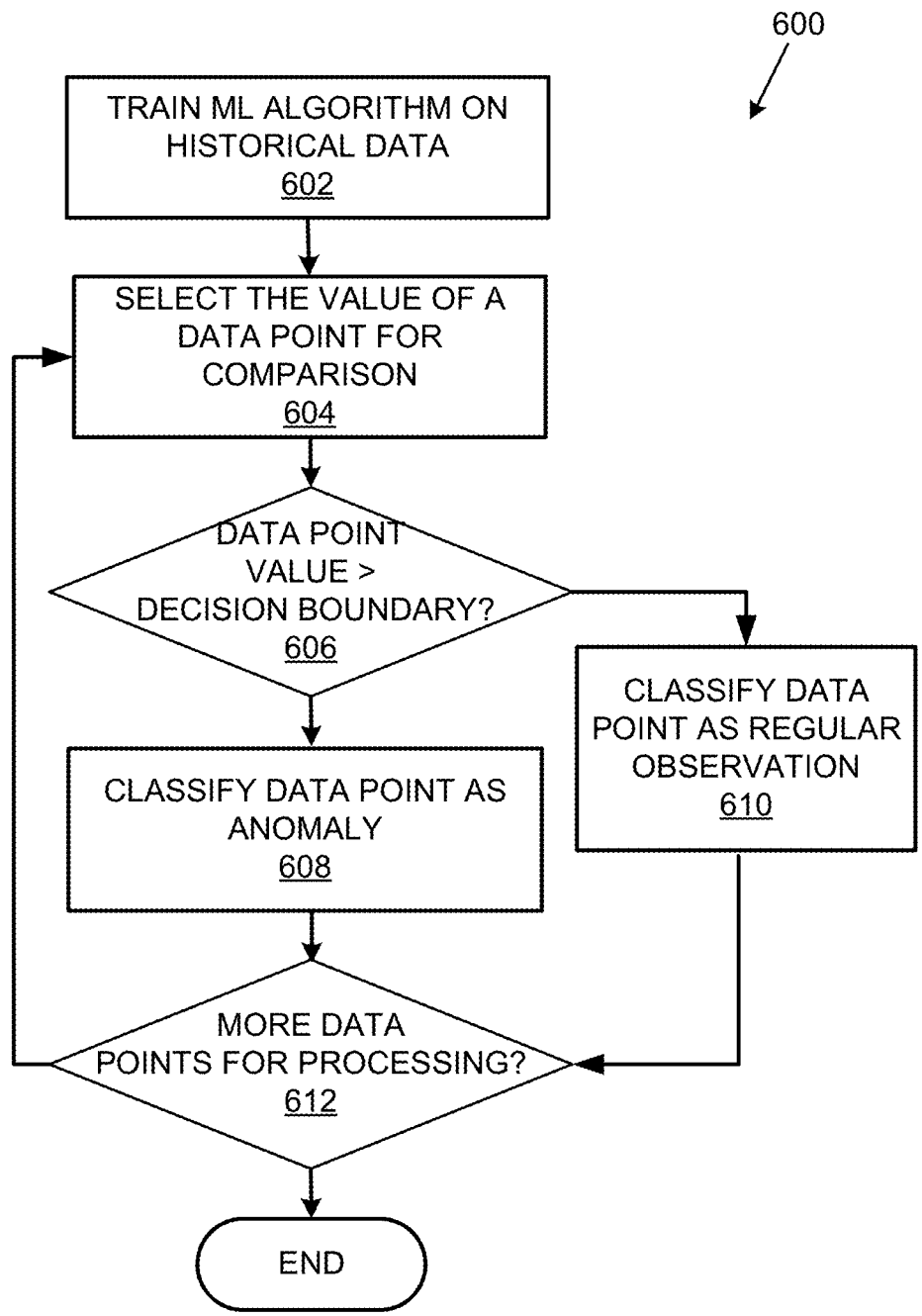
FIG. 6 shows a flowchart that details a method of processing a dataset for contextual anomalies in accordance with examples disclosed herein.

FIG. 6 shows a flowchart 600 that details a method of processing the dataset 154 for contextual anomalies in accordance with examples disclosed herein. The method begins at 602 wherein the ML algorithm such as the isolation forest implemented by the contextual anomaly analyzer is trained on historical data to create a decision boundary. By way of illustration, if the dataset 154 pertains to financial data of an organization for a current time period, then historical data can include the financial data of the organization for prior time periods. Generally, outliers in data are less frequent than regular observations or data values. Moreover, the outliers can be different from the regular data values or observations. Isolation forest algorithm uses such peculiar properties of anomalies for isolating them. The forest is built on the basis of decision trees, each of which has access to a portion of the training data. A feature or attribute of the dataset may be initially selected and a random split value is chosen for that feature. Different branches are followed based on comparisons of the observations or the data values with the split value. The process can continue until an anomaly is isolated or a specified depth is reached.

As the isolation forest algorithm implemented by the contextual anomaly analyzer is trained in setting the decision boundary, at 604, a first data point is selected for comparison of the value of the data point to the decision boundary. It is determined at 606 if the value of the data point is greater than the decision boundary. If yes, the data point is classified as an anomaly at 608 and selected for remediation.

If the value of the data point is less than the decision boundary, the data point is classified as a regular observation at 610 and the method terminates on the end block. At 612, it is determined if other data points remain to be processed. If yes, the method returns to 604 to compare the values of the data points. If no further data points remain to be processed at 612, the method terminates on the end block. It can be appreciated that the processing of the data points is shown as occurring serially only for illustration purposes and that in practice, the contextual anomaly analyzer 304 may indeed process all the data points in the dataset 154 in parallel upon determination of the decision boundary.

Figure 7:
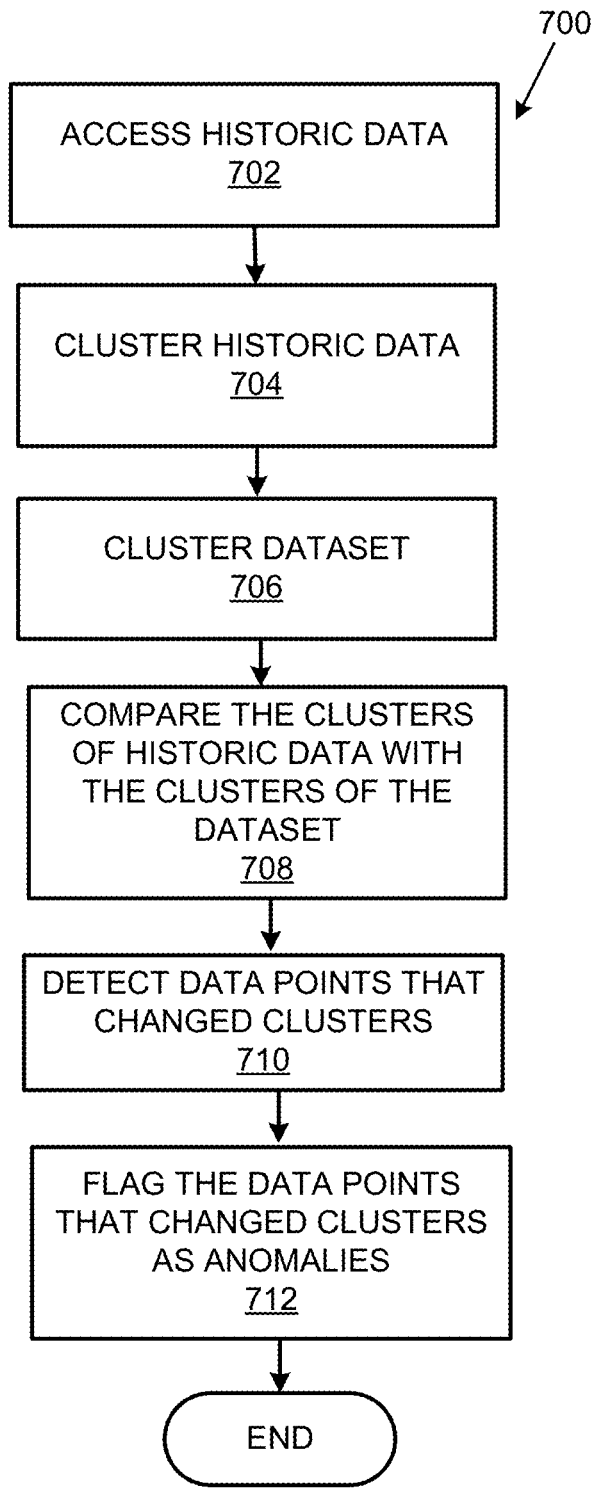
FIG. 7 shows a flowchart that details a method of processing time trend anomalies in accordance with the examples disclosed herein.

FIG. 7 is a flowchart 700 that details a method of processing time trend anomalies in accordance with the examples disclosed herein. The methodology implemented by the time trend anomaly analyzer 306 for detecting the time trend anomalies captures inconsistent patterns, identifies extreme values and missing values with very high accuracy. It works well on higher dimensional data much more efficiently than distance based methods. The method begins at 702 with the time trend anomaly analyzer 306 accessing historical data, e.g., data pertaining to a benchmark period. The historic data is clustered at 704. In an example, distance based approaches such as but not limited to K-means clustering and distance changes to track data value changes over time can be used. In an example, regression techniques which capture large deviations over time can be used for resolution of the anomalous data points. In an example, advanced deep learning techniques such as but not limited to, self-organized maps can be used for clustering the data. In an example, the self-organizing maps may need to initially learn and be tested on the thresholds for detecting the changes of clusters or nodes. Similarly, the dataset 154 is clustered using self-organized maps at 706. In an example, the dataset can pertain to the customers of an organization. Each customer is mapped to a cluster during the clustering process at 704 after the training on the historic data. When the dataset 154 with the same list of customers but with a new updated attribute is received, the same scoring code is used to score the customers. The output is a new cluster assigned to each customer wherein the new cluster may or may not be the same as the old cluster. At 708, the clusters obtained from the historic data are thus compared to the clusters obtained from the dataset 154. In an example, distance measuring methodologies such as measuring the Euclidean distance between the centers of the two clusters can be employed for the comparison at 708. Data points that may have changed clusters when comparing the clusters from the dataset 154 with the historic data are detected at 710. An example, the data points detected at 710 may have changed clusters that are further apart than a predetermined user-configured threshold of distance. The data points that thus changed clusters are flagged as anomalies at 712 and selected for data remediation as it is indicative that the new attribute may have a data quality issue.

Figure 8:
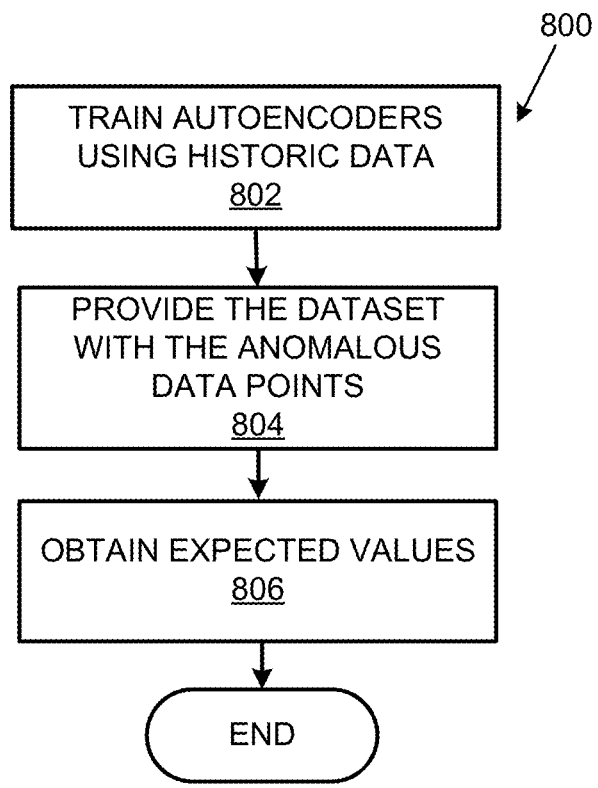
FIG. 8 shows a flowchart that details a method of data remediation in accordance with the examples disclosed herein.

FIG. 8 details a method of data remediation that can be implemented by the data remediation element 108 in accordance with the examples disclosed herein. In an example, autoencoders are employed to generate the expected values. The autoencoders can be initially trained at 802 using historical data pertaining to the domain for the generation of the expected values. At 804, the dataset 154 along with the anomalous data points 158 along with the identification information of the anomalous data points 158 as described herein are fed to the autoencoders. In an example, the error associated with the expected values can be measured and only the expected values with minimum accuracy can be used to replace the anomalous data points 158. Accordingly, when the value of the model error is less than a threshold value, i.e., when the model is sufficiently accurate, it proceeds with the data remediation. At 806, the autoencoders produce expected values for the anomalous data points 158. The expected values are used to replace the anomalous data points 158 as described herein.

As mentioned herein, the user interfaces 140 can be configured to generate interactive visualizations at every step of the data remediation process for user review and validation. Example user case scenarios where data remediation is applied for different anomalies are described below. It can be appreciated that the data remediation techniques described herein can be applied in various domains and use cases other than those described below.

Figure 9:
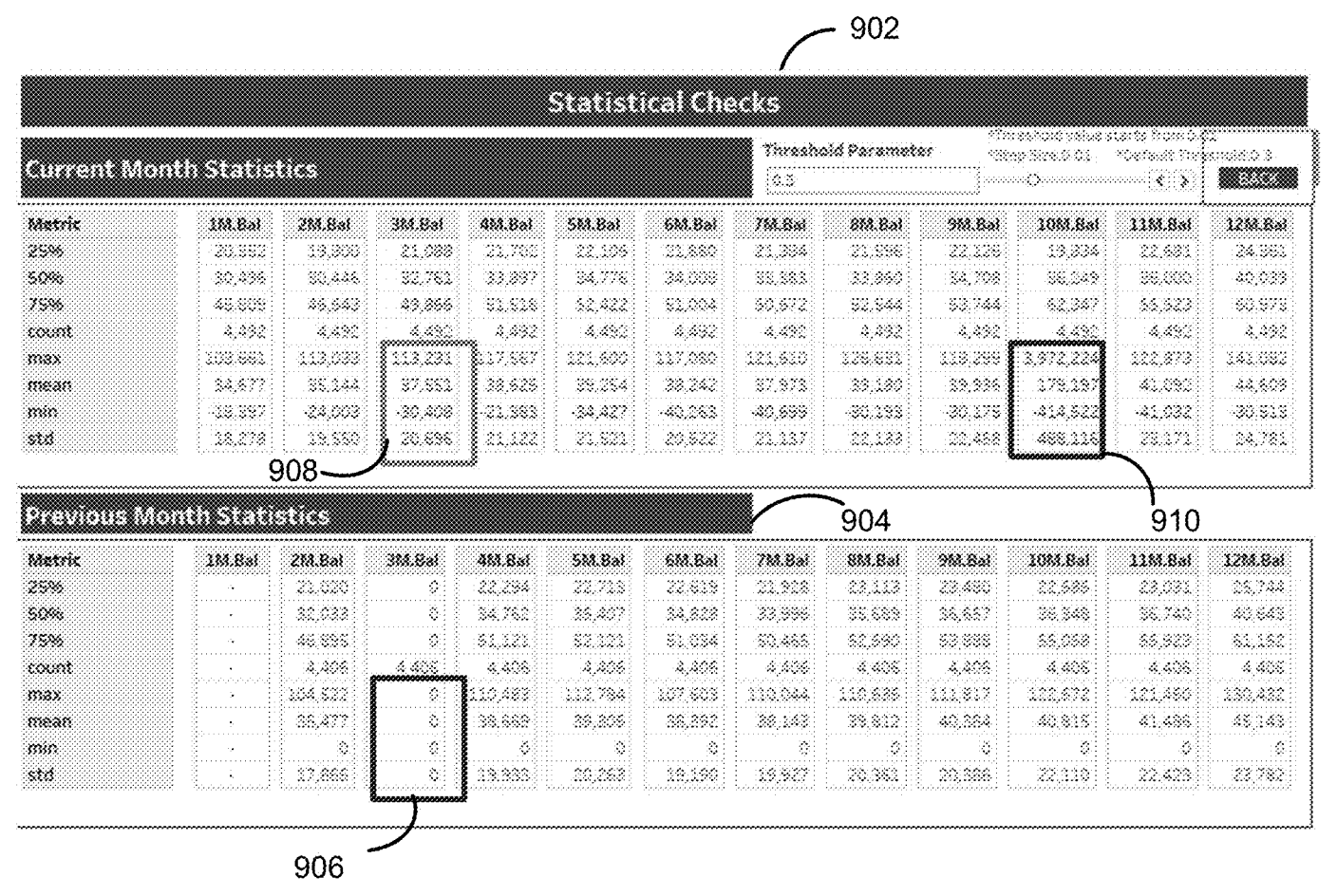

FIG. 9 shows a dataset with point anomalies identified in accordance with the examples disclosed herein. Two data distributions, 902 and 904 including a current month statistics and previous month statistics (historical data) are shown. When the values at the data points shown at 906 and 908 are compared, it can be seen that the values of the attribute jumped from zero to a high value. In this case, the zero at 906 can be classified as an anomaly. Similarly, the values at 910 also are classified as anomalies since the maximum and minimum values are above threshold. In this case, the maximum and the minimum values are also classified as point anomalies.

Figure 10:
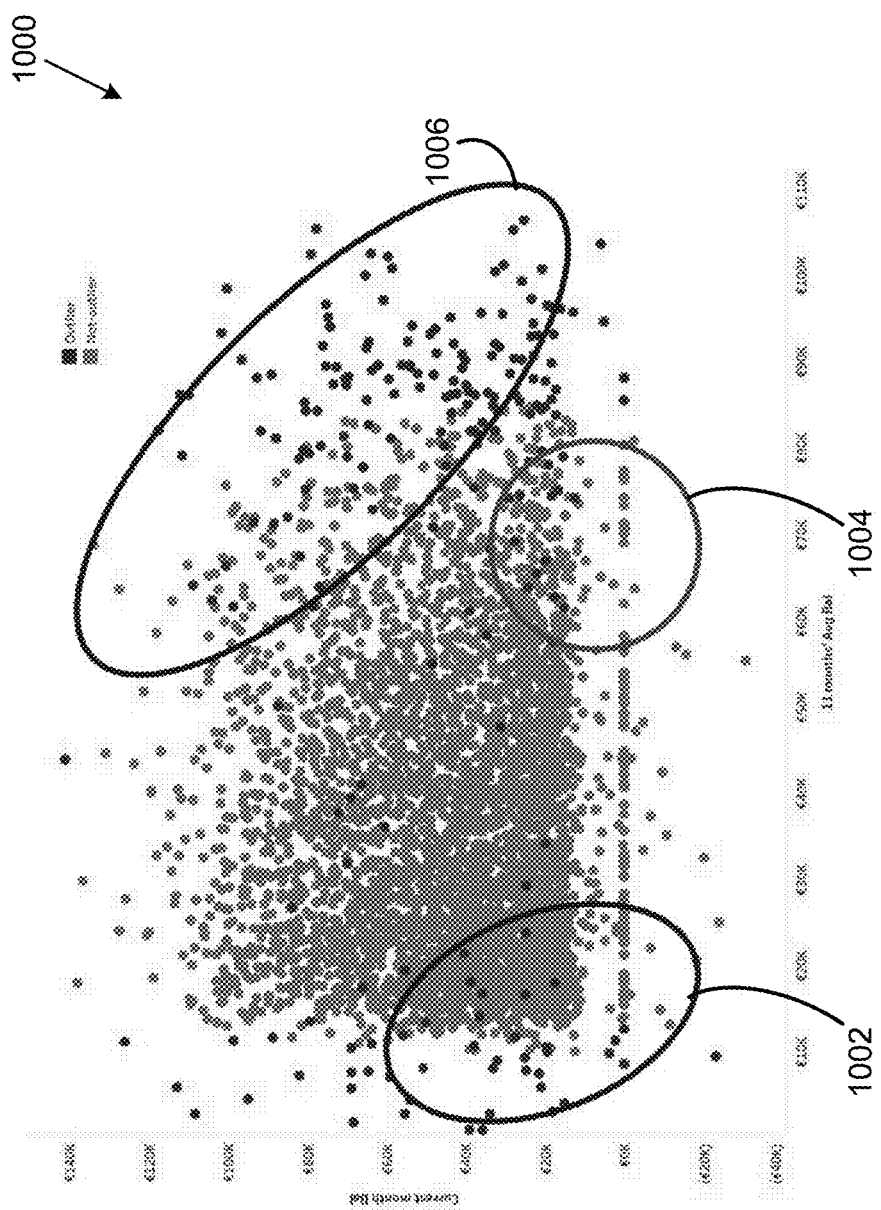
FIG. 10 shows a visualization of a dataset within which contextual anomalies are identified in accordance with the examples disclosed herein.

FIG. 10 shows a visualization 1000 of a dataset within which contextual anomalies are identified and displayed in accordance with the examples disclosed herein. The visualization 1000 can be provided to the user via one of the user interfaces 140. The attribute being analyzed for anomalies in this example is a balance such as a credit card balance for a given month (Y-axis) which is plotted against a 11 month balance (X-axis). Three portions of the dataset 1002, 1004 and 1006 are isolated as including the anomalies using the tree-based ML algorithms as described herein. The anomalies can be indicated via visual indicia such as different colors than regular observations which comply with the thresholds. The various techniques disclosed herein for detecting contextual anomalies can capture 95% of the records with more than one data point missing. Moreover, 58% of the high value change outliers are captured.

Figure 11:
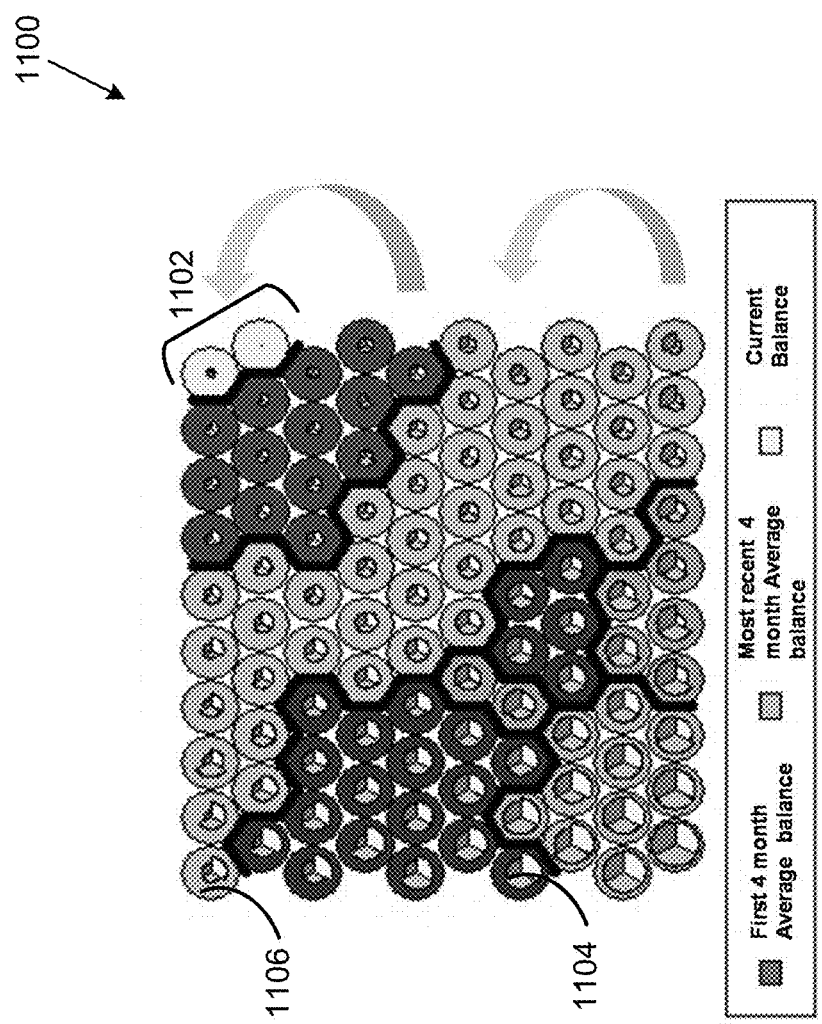
FIG. 11 shows an example of self-organized maps that are used for identifying time trend anomalies in accordance with the examples disclosed herein.

FIG. 11 shows an example of self-organized maps 1100 that are used for identifying time trend anomalies in accordance with the examples disclosed herein. The self-organized maps split the dataset 154 into nodes based on the particular attribute which is being tracked. The mapped dataset is represented as circles such as 1104, 1106, etc. This enables the data remediation system 100 to narrow down pockets of data with anomalies. For example, two points 1102 are identified as anomalies based on movement outside a tagged cluster or movement to another node.

In an example, the remediation of time trend anomalies can find application in identity resolution systems for user identity verification. For example, a user may be registered as 'John Doe' and after a time period, the user's identity data may have incorrect identities such as 'John D' or 'J. Doe'. The data remediation techniques disclosed herein can enable replacing the incorrect identities 'John D' or 'J. Doe' with the corrected user identity.

Figure 12:
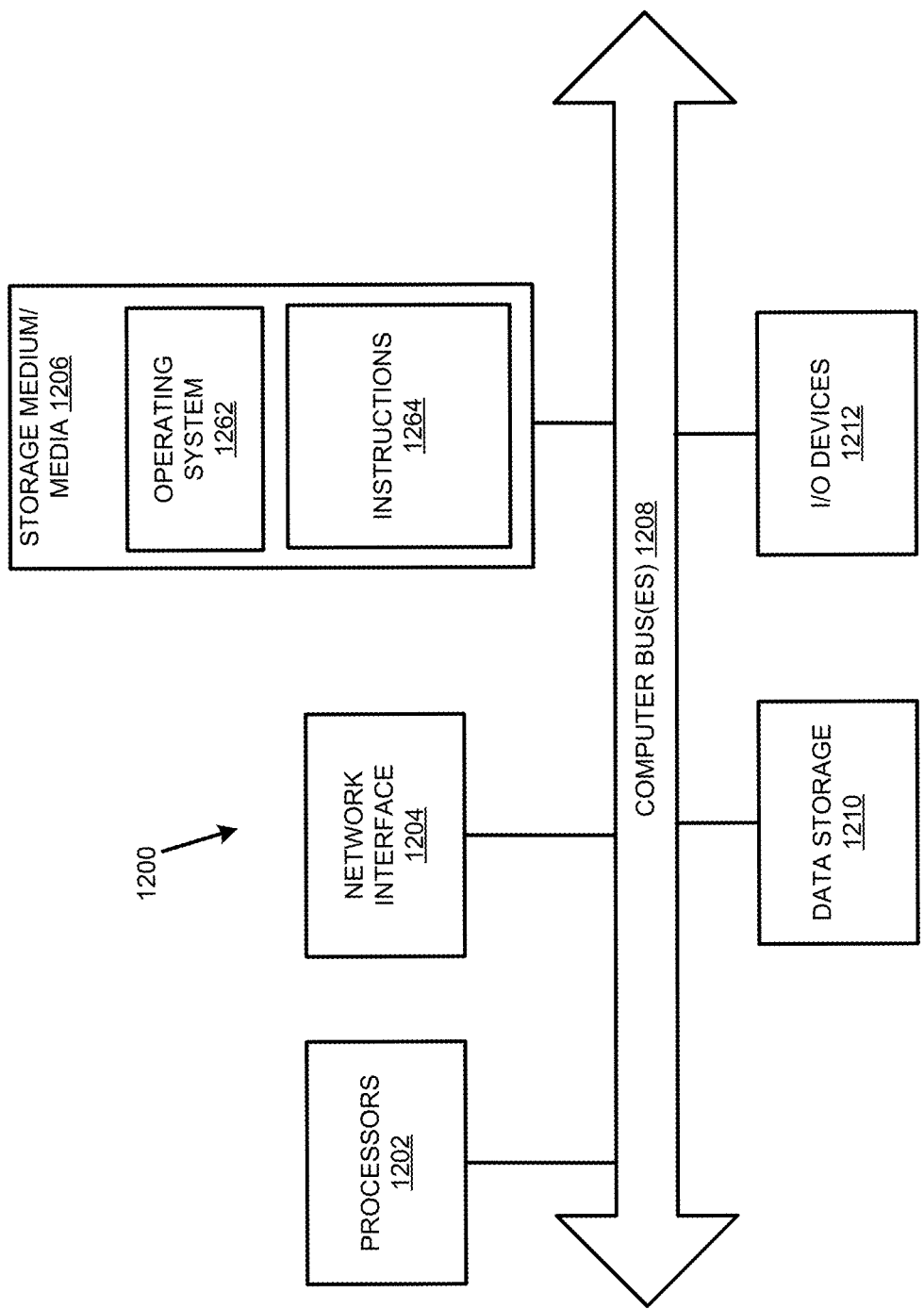
FIG. 12 illustrates a computer system that may be used to implement the AI-based automatic data remediation system in accordance with the examples disclosed herein.

FIG. 12 illustrates a computer system 1200 that may be used to implement the AI-based automatic data remediation system 100. More particularly, computing machines such as desktops, laptops, smartphones, tablets and wearables which may be used to generate or access the data from the data remediation system 100 may have the structure of the computer system 1200. The computer system 1200 may include additional components not shown and that some of the process components described may be removed and/or modified. In another example, a computer system 1200 can sit on external-cloud platforms such as, Amazon Web Services, AZURE® cloud or internal corporate cloud computing clusters, or organizational computing resources, etc.

The computer system 1200 includes processor(s) 1202, such as a central processing unit, ASIC or other type of processing circuit, input/output devices 1212, such as a display, mouse keyboard, etc., a network interface 1204, such as a Local Area Network (LAN), a wireless 802.11x LAN, a 3G or 4G mobile WAN or a WiMax WAN, and a computer-readable medium 1206. Each of these components may be operatively coupled to a bus 1208. The computer-readable medium 1206 may be any suitable medium which participates in providing instructions to the processor(s) 1202 for execution. For example, the processor-readable medium 1206 may be non-transitory or non-volatile medium, such as a magnetic disk or solid-state non-volatile memory or volatile medium such as RAM. The instructions or modules stored on the processor-readable medium 1206 may include machine-readable instructions 1264 executed by the processor(s) 1202 to perform the methods and functions of the data remediation system 100.

The data remediation system 100 may be implemented as software stored on a non-transitory processor-readable medium and executed by the one or more processors 1202. For example, the processor-readable medium 1206 may store an operating system 1262, such as MAC OS, MS WINDOWS, UNIX, or LINUX, and code 1264 for the data remediation system 100. The operating system 1262 may be multi-user, multiprocessing, multitasking, multithreading, real-time and the like. For example, during runtime, the operating system 1262 is running and the code for the data remediation system 100 is executed by the processor(s) 1202.

The computer system 1200 may include a data storage 1210, which may include non-volatile data storage. The data storage 1210 stores any data used by the data remediation system 100. The data storage 1210 may be used to store the anomalous data points 158, the expected values, or other values need for the data remediation procedures.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based automatic data remediation system comprising:
   at least one processor;
   a non-transitory processor readable medium storing machine-readable instructions that cause the at least one processor to:
   access a dataset stored to a data lake from one or more of a plurality of data sources;
   receive a user input conveying a number of attributes of the dataset;
   determine whether the dataset is to be treated for one or more anomalies including missing values and outliers in the dataset via executing a statistical check on the dataset;
   identify portions of the dataset that include the anomalies based on the statistical check;
   classify the anomalies into one of a plurality of anomaly types that include point anomalies, contextual anomalies and time trend anomalies, the anomaly types being determined based on the number of attributes of the dataset;
   identify anomalous data points in the dataset that correspond to the anomalies, wherein the determination of the anomalous data points is based on the anomaly type detected in the dataset;
   obtain expected values for the anomalous data points, the expected values being obtained by employing autoencoders;
   generate a transformed dataset from the dataset by replacing the data points corresponding to the anomalies in the dataset with the expected values; and
   upload the transformed dataset to the data lake.

2. The automatic data remediation system of claim 1, wherein the instructions to determine whether the anomalies include one of a plurality of anomaly types further comprise instructions that cause the processor to:
   determine that the dataset includes the point anomalies when the user input indicates that the dataset has only one attribute.

3. The automatic data remediation system of claim 1, wherein the instructions to determine whether the anomalies include one of a plurality of anomaly types further comprise instructions that cause the processor to:
   determine that the dataset includes the contextual anomalies when the user input indicates that the dataset has multiple attributes.

4. The automatic data remediation system of claim 1, wherein the instructions to determine whether the anomalies include one of a plurality of anomaly types further comprise instructions that cause the processor to:
   determine that the dataset includes the time trend anomalies when the user input indicates that the dataset tracks a single attribute over a time period.

5. The automatic data remediation system of claim 1, wherein the instructions to determine whether the dataset is to be treated for one or more anomalies via the statistical check further comprise instructions that cause the processor to:
   compare a distribution of the dataset with a standard distribution of the dataset; and
   determine that a percentage number of the anomalies in the dataset exceed a predetermined threshold.

6. The automatic data remediation system of claim 1, wherein the instructions to determine data points in the dataset that correspond to the anomalies further comprise instructions that cause the processor to:
   when the anomalies include the point anomalies,
   obtain a univariate distribution of the dataset;
   determine a threshold from the univariate distribution for identifying the outliers; and
   determine percentile distribution volatility and the outliers beyond the threshold.

7. The automatic data remediation system of claim 1, wherein the instructions to determine data points in the dataset that correspond to the anomalies further comprise instructions that cause the processor to:
   when the anomalies include the contextual anomalies,
   obtain a decision boundary by processing the dataset via isolation forest technique, and classify the data points as the anomalies via a comparison with the decision boundary.

8. The automatic data remediation system of claim 7, further comprises instructions that cause the processor to:
   train the isolation forest model to obtain the decision boundary using training data for a domain pertaining to the dataset.

9. The automatic data remediation system of claim 1, wherein the instructions to determine data points in the dataset that correspond to the anomalies further comprise instructions that cause the processor to:
   when the anomalies include time trend anomalies:
   cluster the data points within the dataset using self-organized maps;
   compare the clusters obtained from the dataset to clusters obtained from a dataset of a previous time period; and
   identify one or more of the data points changing clusters from the previous time period as the anomalies.

10. The automatic data remediation system of claim 9, further comprises instructions that cause the processor to:
    train the self-organized maps to cluster the data points of the dataset using training data for a domain pertaining to the dataset.

11. The automatic data remediation system of claim 1, wherein the instructions to obtain the expected values for the data points that correspond to the anomalies further comprise instructions that cause the processor to:
    input the data points corresponding to the anomalies to an autoencoder; and
    obtain the expected values corresponding to each of the input data points from the autoencoder.

12. The automatic data remediation system of claim further comprising instructions that cause the processor to:

generate interactive visualizations displaying the anomalies.

13. The automatic data remediation of claim wherein the dataset pertains to finance domain and the non-transitory processor readable medium storing further machine-readable instructions that cause the at least one processor to:
flag the anomalies for fraudulent activity checks.

14. The automatic data remediation of claim 1, wherein the dataset pertains to manufacturing domain and the non-transitory processor readable medium storing further machine-readable instructions that cause the at least one processor to:
flag the anomalies as system errors.

15. An artificial intelligence (AI) based data remediation method comprising:
accessing a dataset stored to a data lake from one or more of a plurality of data sources;
receiving a user input conveying a number of attributes of the dataset;
determining whether the dataset is to be treated for one or more anomalies including missing values and outliers in the dataset via executing a statistical check on the dataset;
identifying portions of the dataset that include the anomalies based on the statistical check;
classifying the anomalies into one of a plurality of anomaly types that include point anomalies, contextual anomalies and time trend anomalies, the anomaly types being determined based on the number of attributes of the dataset;
identifying anomalous data points in the dataset that correspond to the anomalies, wherein the determination of the anomalous data points is based on the anomaly type detected in the dataset; and
outputting the anomalous data points via a user interface for user validation.

16. The method of claim 15, wherein the dataset pertains to credit card balance and the user validation includes fraudulent activity check.

17. The method of claim 15, wherein the user validation includes identity verification and the method further comprises:
obtaining expected values including corrected user identity for the anomalous data points, pertaining to incorrect identities, wherein the expected values are obtained by employing autoencoders;
generating a transformed dataset from the dataset by replacing the incorrect identities in the dataset with the corrected user identity; and
upload the transformed dataset to the data lake.

18. A non-transitory processor-readable storage medium comprising machine-readable instructions that cause a processor to:
access a dataset stored to a data lake from one or more of a plurality of data sources;
receive a user input conveying a number of attributes of the dataset;
determine whether the dataset is to be treated for one or more anomalies including missing values and outliers in the dataset via executing a statistical check on the dataset;
identify portions of the dataset that include the anomalies based on the statistical check;
classify the anomalies into one of a plurality of anomaly types that include point anomalies, contextual anomalies and time trend anomalies, the anomaly types being determined based on the number of attributes of the dataset;
identify anomalous data points in the dataset that correspond to the anomalies, wherein the determination of the anomalous data points is based on the anomaly type detected in the dataset;
obtain expected values for the anomalous data points, the expected values being obtained by employing autoencoders;
generate a transformed dataset from the dataset by replacing the data points corresponding to the anomalies in the dataset with the expected values; and
upload the transformed dataset to the data lake.

19. The non-transitory processor-readable storage medium of claim 18, further comprising instructions that cause the processor to:
input the data points corresponding to the anomalies to an autoencoder; and
obtain the expected values corresponding to each of the input data points from the autoencoder.

20. The non-transitory processor-readable storage medium of claim 18, further comprising instructions that cause the processor to:
generate interactive visualizations displaying the anomalies.

* * * * *